US012270791B1

(12) United States Patent
Meng et al.

(10) Patent No.: US 12,270,791 B1
(45) Date of Patent: Apr. 8, 2025

(54) METHOD, SYSTEM AND DEVICE FOR DETERMINING INTERLAMINAR SHEAR STRENGTH OF COMPOSITE LAMINATED PLATE

(71) Applicant: CATARC Co., Ltd., Tianjin (CN)

(72) Inventors: Xianming Meng, Tianjin (CN); Sai Zhang, Tianjin (CN); Tong Song, Tianjin (CN); Pengfei Ren, Tianjin (CN); Xiaozhong Wu, Tianjin (CN); Xianglei Zhu, Tianjin (CN); Xingfeng Cao, Tianjin (CN); Xinfu Zheng, Tianjin (CN); Tao Li, Tianjin (CN); Zhixin Wu, Tianjin (CN)

(73) Assignee: CATARC CO., LTD., Tianjin (CN)

( * ) Notice: Subject to any disclaimer, the term of this patent is extended or adjusted under 35 U.S.C. 154(b) by 0 days.

(21) Appl. No.: 18/912,179

(22) Filed: Oct. 10, 2024

(30) Foreign Application Priority Data

Dec. 18, 2023 (CN) .......................... 202311735823.4

(51) Int. Cl.
*G01N 3/24* (2006.01)
*G01N 3/06* (2006.01)

(52) U.S. Cl.
CPC .............. *G01N 3/24* (2013.01); *G01N 3/068* (2013.01); *G01N 2203/0062* (2013.01)

(58) Field of Classification Search
CPC .. G01N 3/24; G01N 3/068; G01N 2203/0062; G01N 19/04; G01N 33/00; G01N 3/30; G01N 1/286; G01N 3/08; C08J 5/06; C08J 5/242; C08J 5/24; B32B 5/26; B32B 37/12; B32B 37/18; B32B 27/12;

(Continued)

(56) References Cited

U.S. PATENT DOCUMENTS

2020/0371006 A1* 11/2020 Hu ........................... G01N 3/02
2022/0242066 A1* 8/2022 Menéndez Martín ..................
                                                            B29C 70/545

FOREIGN PATENT DOCUMENTS

CN         109682680 A  *  4/2019   ............... G01N 3/02

OTHER PUBLICATIONS

"Standard Test Method for Mode I Interlaminar Fracture Toughness of Unidirectional Fiber-Reinforced Polymer Matrix Composites," ASTM International, D5528/D5528M-21 (2022).

(Continued)

*Primary Examiner* — Brandi N Hopkins
(74) *Attorney, Agent, or Firm* — Troutman Pepper Locke LLP

(57) ABSTRACT

A method, a system and a device for determining interlaminar shear strength of a composite laminated plate are provided. The method includes following steps: constructing a force-displacement curve of a composite laminated plate specimen based on strain data, corresponding to different displacements of the indenter, of the composite laminated plate specimen; determining a dominant strain based on plane strain nephograms; reading any defect in the plane strain nephogram corresponding to one displacement as a current defect, and determining a test force acting on the whole composite laminated plate specimen corresponding to the reference displacement of the indenter as a critical strain value; determining a product of the critical strain value and shear modulus under the dominant strain as the shear strength between adjacent single layers to be tested.

13 Claims, 4 Drawing Sheets

(58) Field of Classification Search
CPC ......... G06F 30/23; G06F 30/15; G16C 60/00; Y02T 90/00; B29C 66/729; B29C 70/42; F41H 5/04; B29D 99/0003; B64C 27/32
See application file for complete search history.

(56) References Cited

OTHER PUBLICATIONS

"Standard Test Method for Mixed Mode I-Mode II Interlaminar Fracture Toughness of Unidirectional Fiber Reinforced Polymer Matrix Composites," ASTM International, D6671/D6671M-22 (2022).

* cited by examiner

METHOD, SYSTEM AND DEVICE FOR DETERMINING INTERLAMINAR SHEAR STRENGTH OF COMPOSITE LAMINATED PLATE

CROSS-REFERENCE TO RELATED APPLICATION

This patent application claims the benefit and priority of Chinese Patent Application No. 202311735823.4 filed with the China National Intellectual Property Administration on Dec. 18, 2023, the disclosure of which is incorporated by reference herein in its entirety as part of the present application.

TECHNICAL FIELD

The present disclosure relates to the technical field of determining interlaminar shear strength, and in particular to a method, a system and a device for determining interlaminar shear strength of a composite laminated plate.

BACKGROUND

Fiber reinforced composite laminated plates are widely used in the fields of aerospace, automobile and ship due to their excellent specific strength, specific stiffness and strong designability. Autoclave molding process is the most widely used composite molding technology at present, wherein the single-layer composites are placed in an autoclave, subjected to heating, heat preservation, cooling and pressure relief in a vacuum state, and then stacked to form the laminated plates, which generally has excellent in-layer performance as its lay-up design. However, the laminated composite has poor interlaminar performance and is prone to delamination, and shows weak ability to resist the impact of foreign objects in practical application, so the interlaminar strength test performed on the laminated composite is an extremely important one of the performance tests in production and application. At present, the commonly used interlaminar performance test of the fiber reinforced composite laminated plates mainly refers to the test standards (such as ASTM D5528 and D6671) formulated by the American Society for Testing and Materials, which require the specimens to be preembedded with prefabricated cracks during the preparation and molding. However the molded fiber reinforced composite laminated plates cannot meet the requirements of test conditions by resizing and other methods, further, the parameters such as load, displacement and crack propagation length need to be obtained in real time during the test, which is greatly influenced by human factors. Meanwhile, these two test standards and other test methods improved based on these two test standards mainly focus on the measurement of interlaminar fracture toughness, and the measurement methods or apparatuses used therein are complicated. At present, there is no method for accurately and rapidly measuring interlaminar shear strength of a fiber reinforced composite laminated plate in academic and industrial circles.

SUMMARY

An objective of the present disclosure is to provide a method, a system and a device for determining interlaminar shear strength of a composite laminated plate, which can improve the accuracy and efficiency of measuring the interlaminar shear strength of the composite laminated plate.

To achieve the objective above, the present disclosure provides the following technical solution:

A method for determining interlaminar shear strength of a composite laminated plate is provided, which is implemented by an apparatus for determining interlaminar shear strength of a composite laminated plate. The apparatus includes:

an electronic universal testing machine, a digital image correlation (DIC) measurement apparatus, a clamping apparatus for short beam shear tests, and a control module.

The control module is linked to the clamping apparatus for short beam shear tests, the electronic universal testing machine and the DIC measurement apparatus.

The clamping apparatus for short beam shear tests is arranged on a testing bench of the electronic universal testing machine, and is configured to clamp a composite laminated plate specimen; and a side surface of the composite laminated plate specimen is provided with a plurality of speckles.

The electronic universal testing machine is configured to control an indenter to move toward the composite laminated plate specimen to exert pressure on the composite laminated plate specimen, and to acquire strain data, corresponding to different displacements of the indenter, of the composite laminated plate specimen, the strain data comprises test forces acting on the whole composite laminated plate specimen, an out-of-plane shear strain of each of the speckles on the composite laminated plate specimen, and an out-of-plane normal strain of each of the speckles on the composite laminated plate specimen.

The DIC measurement apparatus is configured to determine plane strain nephograms, corresponding to the different displacements of the indenter, of the composite laminated plate specimen based on images of the side surface of the composite laminated plate specimen.

The method includes following steps:

acquiring plane strain nephograms, and strain data, corresponding to the different displacements of the indenter, of a composite laminated plate specimen;

constructing a force-displacement curve of the composite laminated plate specimen based on the strain data, corresponding to the different displacements of the indenter, of the composite laminated plate specimen;

determining a dominant strain based on the plane strain nephograms and the strain data, corresponding to the different displacements of the indenter, of the composite laminated plate specimen, wherein the dominant strain is the out-of-plane shear strain or the out-of-plane normal strain;

reading any one of defects in a plane strain nephogram corresponding to any one of the displacements of the indenter as a current defect;

determining two single layers adjacent to the current defect as adjacent single layers to be tested;

constructing a dominant strain potential difference-displacement curve of the adjacent single layers to be tested based on the current defect;

determining a displacement corresponding to an abrupt slope change point in the dominant strain potential difference-displacement curve as a reference displacement;

determining a test force acting on the whole composite laminated plate specimen corresponding to the reference displacement of the indenter as a critical strain value based on the force-displacement curve;

acquiring a shear modulus under the dominant strain;

determining a product of the critical strain value and the shear modulus under the dominant strain as shear strength between the adjacent single layers to be tested.

Alternatively, determining a dominant strain based on the plane strain nephograms and the strain data, corresponding to the different displacements of the indenter, of the composite laminated plate specimen comprises following steps:

setting an iteration number i=1;

setting a cumulative amount corresponding to the out-of-plane shear strain m=0;

setting a cumulative amount corresponding to the out-of-plane normal strain n=0;

determining any one of the displacements as a current displacement;

reading a defect of a plane strain nephogram corresponding to the current displacement as a reference defect detection result;

constructing an out-of-plane shear strain nephogram based on the out-of-plane shear strain, corresponding to the current displacement, of each of the speckles on the composite laminated plate specimen;

reading a defect of the out-of-plane shear strain nephogram corresponding to the current displacement as a first detection result;

determining a coincidence rate of the first detection result and the reference defect detection result as a first coincidence rate;

constructing an out-of-plane normal strain nephogram based on the out-of-plane normal strain, corresponding to the current displacement, of each of the speckles on the composite laminated plate specimen;

reading a defect of the out-of-plane normal strain nephogram corresponding to the current displacement as a second detection result;

determining a coincidence rate of the second detection result and the reference defect detection result as a second coincidence rate;

returning to Step "setting an iteration number i=1" when the second coincidence rate is equal to the first coincidence rate;

increasing a value of the cumulative amount corresponding to the out-of-plane normal strain n by 1 when the second coincidence rate is greater than the first coincidence rate;

increasing a value of the cumulative amount corresponding to the out-of-plane shear strain m by 1 when the second coincidence rate is less than the first coincidence rate;

updating the current displacement, increasing a value of the iteration number i by 1, and returning to Step "reading a defect of a plane strain nephogram corresponding to the current displacement as a reference defect detection result" until the value of the iteration number i reaches a threshold of the iteration number;

determining the out-of-plane normal strain as the dominant strain when the cumulative amount corresponding to the out-of-plane normal strain n is greater than the cumulative amount corresponding to the out-of-plane shear strain m; and determining the out-of-plane shear strain as the dominant strain when the cumulative amount corresponding to the out-of-plane normal strain n is less than or equal to the cumulative amount corresponding to the out-of-plane shear strain m.

Alternatively, constructing a dominant strain potential difference-displacement curve of the adjacent single layers to be tested based on the current defect comprises following steps:

determining a point at a preset distance directly above a center point of the current defect as a first feature point, wherein the preset distance is less than a thickness of any single layer in the composite laminated plate specimen;

determining a point at a preset distance directly below the center point of the current defect as a second feature point;

acquiring dominant strains, corresponding to the different displacements of the indenter, of the first feature point based on a time stamp;

acquiring dominant strains, corresponding to the different displacements of the indenter, of the second feature point based on the time stamp;

determining any one of the displacements as the current displacement;

determining a difference between a dominant strain, corresponding to the current displacement of the indenter, of the first feature point and a dominant strain, corresponding to the current displacement of the indenter, of the second feature point as a dominant strain potential difference, corresponding to the current displacement of the indenter, between the adjacent single layers to be tested; and constructing the dominant strain potential difference-displacement curve of the adjacent single layers to be tested with the displacements as abscissa and dominant strain potential differences between the adjacent single layers to be tested as ordinate.

Alternatively, after determining a product of the critical strain value and the shear modulus under the dominant strain as shear strength between the adjacent single layers to be tested, the method further comprises following steps:

updating the adjacent single layers to be tested, taking a defect corresponding to the updated adjacent single layers to be tested as the current defect, and returning to Step "constructing a dominant strain potential difference-displacement curve of the adjacent single layers to be tested based on the current defect" until all adjacent single layers are traversed, thus obtaining the shear strength between any adjacent single layers of all adjacent single layers in the composite laminated plate specimen.

A system for determining interlaminar shear strength of a composite laminated plate includes:

a strain data acquisition module, configured to acquire plane strain nephograms, and strain data, corresponding to different displacements of an indenter, of a composite laminated plate specimen;

a force-displacement curve construction module, configured to construct a force-displacement curve of the composite laminated plate specimen based on the strain data, corresponding to different displacements of an indenter, of the composite laminated plate specimen;

a dominant strain determination module, configured to determine a dominant strain based on the plane strain nephograms and the strain data, corresponding to different displacements of an indenter, of the composite laminated plate specimen, wherein the dominant strain is an out-of-plane shear strain or an out-of-plane normal strain;

a current defect determination module, configured to read any one of defects in a plane strain nephogram corresponding to any one of the displacements as a current defect;

a current defect determination module, configured to read any one of defects in a plane strain nephogram corresponding to any one of the displacements as a current defect;

a dominant strain potential difference-displacement curve construction module, configured to construct a dominant strain potential difference-displacement curve of the adjacent single layers to be tested based on the current defect;

a reference displacement determination module, configured to determine a displacement corresponding to an abrupt slope change point in the dominant strain potential difference-displacement curve as a reference displacement;

a critical strain value determination module, configured to determine a test force acting on the whole composite laminated plate specimen corresponding to the reference displacement of the indenter as a critical strain value based on the force-displacement curve;

a shear modulus acquisition module, configured to acquire shear modulus under the dominant strain; and;

a shear strength determination module, configured to determine a product of the critical strain value and the shear modulus under the dominant strain as shear strength between the adjacent single layers to be tested.

An electronic device includes a memory and a processor. The memory is configured to store a computer program, the processor runs the computer program to enable the electronic device to execute the method for determining interlaminar shear strength of a composite laminated plate.

Alternatively, the memory is a readable storage medium.

According to specific embodiments of the present disclosure, the present disclosure has the following technical effects:

According to the method, system and device for determining the interlaminar shear strength of a composite laminated plate, the used composite laminated plate specimen does not require to be designed with preparation ends, but only needs to be processed in size meeting the requirements of short beam shear standards. The measurement apparatuses are commonly used devices in general laboratories and combinations thereof, and there is no need to improve the test device. The analysis idea is simple and the test phenomenon is obvious, which can provide quantitative data support for interlaminar shear strength in industrial production. The solution in the present disclosure can improve accuracy and efficiency of measuring the interlaminar shear strength of the composite laminated plate, and is well applicable.

BRIEF DESCRIPTION OF THE DRAWINGS

To describe the technical solutions of the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

DETAILED DESCRIPTION OF THE EMBODIMENTS

Figure 1:
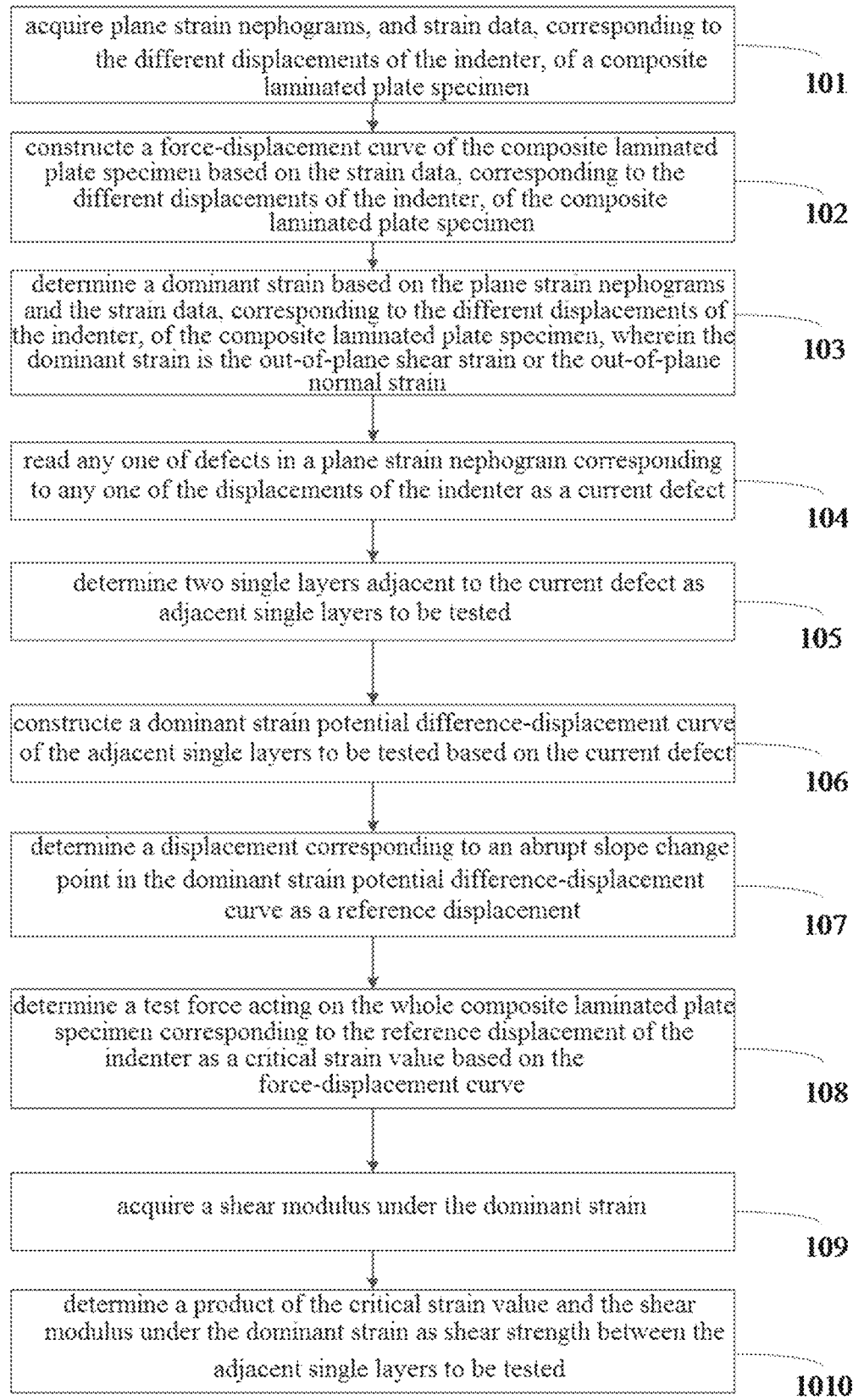
FIG. 1 is a flow diagram of a method for determining interlaminar shear strength of a composite laminated plate according to Embodiment 1 of the present disclosure.

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the scope of protection of the present disclosure.

Objectives of the present disclosure is to provide a method, a system and a device for determining interlaminar shear strength of a composite laminated plate, which can improve the accuracy and efficiency of measuring the interlaminar shear strength of the composite laminated plate.

In order to make the objectives, technical solutions and advantages of the present disclosure more clearly, the present disclosure is further described in detail below with reference to the embodiments.

Embodiment 1

Provided is a method for determining interlaminar shear strength of a composite laminated plate, which is implemented by an apparatus for determining the interlaminar shear strength of the composite laminated plate. The apparatus includes an electronic universal testing machine, a DIC measurement apparatus, a clamping apparatus for short beam shear tests and a control module. The control module is linked to the clamping apparatus for short beam shear tests, the electronic universal testing machine and the DIC measurement apparatus. The clamping apparatus for short beam shear tests is arranged on a testing bench of the electronic universal testing machine. The clamping apparatus for short beam shear tests is configured to clamp a composite laminated plate specimen. A side surface of the composite laminated plate specimen is provided with multiple speckles. The electronic universal testing machine is configured to control an indenter to move toward the composite laminated plate specimen to exert pressure on the composite laminated plate specimen, and to acquire strain data, corresponding to different displacements of the indenter, of the composite laminated plate specimen. The strain data includes test forces acting on the whole composite laminated plate specimen, an out-of-plane shear strain of each speckle on the composite laminated plate specimen, and an out-of-plane normal strain of each speckle on the composite laminated plate specimen. The DIC measurement apparatus is configured to determine plane strain nephograms, corresponding to the different displacements of the indenter, of the composite laminated plate specimen based on images of the side surface of the composite laminated plate specimen. The model of the electronic universal testing machine is Instron 5982. The clamping apparatus for short beam shear tests conforms to ASTM D2344 standard. The composite laminated plate specimen is prepared based on the ASTM D2344 standard.

As shown in FIG. 1, the method for determining interlaminar shear strength of the composite laminated plate includes the following steps 101 to 1011:

In step 101: plane strain nephograms and strain data, corresponding to different displacements of an indenter, of a composite laminated plate specimen are acquired by an apparatus for determining interlaminar shear strength of a composite laminated plate;

In step 102: a force-displacement curve of the composite laminated plate specimen is constructed by the apparatus based on the strain data, corresponding to different displacements of the indenter, of the composite laminated plate specimen;

In step 103: a dominant strain is determined by the apparatus based on the plane strain nephograms and the strain data, corresponding to different displacements of the indenter, of the composite laminated plate specimen, where the dominant strain is an out-of-plane shear strain or an out-of-plane normal strain;

In step 104: any one of defects in a plane strain nephogram corresponding to any one of the displacements is read as a current defect by the apparatus;

In step 105: two single layers adjacent to the current defect are determined as adjacent single layers to be tested by the apparatus;

In step 106: a dominant strain potential difference-displacement curve of the adjacent single layers to be tested is constructed by the apparatus based on the current defect;

In step 107: a displacement corresponding to an abrupt slope change point in the dominant strain potential difference-displacement curve is determined as a reference displacement by the apparatus;

In step 108: based on the force-displacement curve, a test force acting on the whole composite laminated plate specimen corresponding to the reference displacement of the indenter is determined as a critical strain value by the apparatus;

In step 109: a shear modulus corresponding to the reference displacement of the indenter under the dominant strain is acquired by the apparatus;

In step 1010: a product of the critical strain value and the shear modulus corresponding to the reference displacement of the indenter under the dominant strain is determined as shear strength between the adjacent single layers to be tested by the apparatus; and In step 1011: the adjacent single layers to be tested is updated by the apparatus, a defect corresponding to the updated adjacent single layers to be tested is taken as the current defect by the apparatus, and step 106 is returned to by the apparatus until all adjacent single layers are traversed, thus obtaining the shear strength between any adjacent single layers of all adjacent single layers in the composite laminated plate specimen.

Step 103 includes the following steps 103-1 to 103-17:

In step 103-1: the iteration number i is set to equal to 1;

In step 103-2: a cumulative amount corresponding to the out-of-plane shear strain m is set to equal to 0;

In step 103-3: a cumulative amount corresponding to the out-of-plane normal strain n is set to equal to 0;

In step 103-4: any one of the displacements of the indenter is determined as a current displacement;

In step 103-5: a defect of a plane strain nephogram corresponding to the current displacement is read as a reference defect detection result;

In step 103-6: an out-of-plane shear strain nephogram is constructed based on the out-of-plane shear strain, corresponding to the current displacement, of each of the speckles on the composite laminated plate specimen;

In step 103-7: a defect of the out-of-plane shear strain nephogram corresponding to the current displacement is read as a first detection result;

In step 103-8: a coincidence rate of the first detection result and the reference defect detection result is determined as a first coincidence rate;

In step 103-9: an out-of-plane normal strain nephogram is constructed based on the out-of-plane normal strain, corresponding to the current displacement, of each of the speckles on the composite laminated plate specimen;

In step 103-10: a defect of the out-of-plane normal strain nephogram corresponding to the current displacement is read as a second detection result;

In step 103-11: a coincidence rate of the second detection result and the reference defect detection result is determined as a second coincidence rate;

In step 103-12: step 103-1 is returned to when the second coincidence rate is equal to the first coincidence rate;

In step 103-13: a value of the cumulative amount corresponding to the out-of-plane normal strain n is increased by 1 when the second coincidence rate is greater than the first coincidence rate;

In step 103-14: a value of the cumulative amount corresponding to the out-of-plane shear strain m is increased by 1 when the second coincidence rate is less than the first coincidence rate;

In step 103-15: the current displacement is updated, a value of the iteration number i is increased by 1, and step 103-5 is returned to until the value of the iteration number i reaches a threshold of the iteration number;

In step 103-16: the out-of-plane normal strain is determined as the dominant strain when the cumulative amount corresponding to the out-of-plane normal strain n is greater than the cumulative amount corresponding to the out-of-plane shear strain m; and In step 103-17: the out-of-plane shear strain is determined as the dominant strain when the cumulative amount corresponding to the out-of-plane normal strain n is less than or equal to the cumulative amount corresponding to the out-of-plane shear strain m.

Step 106 includes the following steps 106-1 to 106-7:

In step 106-1: a point at a preset distance directly above a center point of the current defect is determined as a first feature point, where the preset distance is less than a thickness of any single layer in the composite laminated plate specimen;

In step 106-2: a point at a preset distance directly below the center point of the current defect is determined as a second feature point;

In step 106-3: based on a time stamp, dominant strains, corresponding to different displacements of the indenter, of the first feature point are acquired;

In step 106-4: based on the time stamp, dominant strains, corresponding to different displacements of the indenter, of the second feature point are acquired;

In step 106-5: any one of the displacement is determined as the current displacement;

In step 106-6: a difference between a dominant strain, corresponding to the current displacement of the indenter, of the first feature point and a dominant strain, corresponding to the current displacement of the indenter, of the second feature point is determined as a dominant strain potential difference, corresponding to the current displacement of the indenter, between the adjacent single layers to be tested; and In step 106-7: the dominant strain potential difference-displacement curve of the adjacent single layers to be tested is constructed with the displacements as abscissa and the dominant strain potential differences between the adjacent single layers to be tested as ordinate.

Specifically, the testing apparatus and materials involved in the present disclosure include: Instron 5982 electronic universal testing machine and the DIC measurement apparatus, and a clamping apparatus for short beam shear tests which conforms to ASTM D2344 standard. A composite laminated plate specimen meeting the requirements of the ASTM D2344 standard is prepared, and speckles are formed on the side surface of the specimen to facilitate the subsequent DIC measurement. White paint should be used as a basecoat in the process of making the speckles for DIC specimen surface treatment. The black paint, when sprayed, should be prevented from aiming at the specimen, and should be evenly scattered on the surface of the specimen under gravity thereof, and a proper mixing ratio of the black paint to the white paint is 1:1. The specimen is symmetrically placed in the electronic universal testing machine using the clamping apparatus for short beam shear tests, and an acquisition frequency, test preload, a loading scheme and an DIC acquisition frequency of the testing machine are set. A photographing frequency of the DIC should be as short as possible to ensure the accuracy of the test results, but the total number of photos should be controlled during the total test to prevent the waste of computing resources. Specimen symmetry includes front-back symmetry and left-right symmetry, and the test scheme should meet the requirements of ASTM 2344 test standard. The acquisition of pressure-displacement test data and strain data of the side surface of the specimen is completed. Single-layer plates on both sides of a feature position are subjected to shear strain potential difference analysis, so as to estimate interlaminar shear strength in combination with the test curve and out-of-plane shear modulus. The shear strain potential difference analysis process mainly includes selecting feature points of single-layer plates on both sides, outputting historical change data of shear strain and making a difference, and determining whether the data is valid or not. The feature points should be selected from the feature positions of adjacent delamination regions, which should not be too close to cause curve loss and too far to cause inaccurate test results. It is generally recommended that the distance between the shear strain analysis positions on both sides is about a thickness of a single layer plate. The out-of-plane shear strength can be expressed as follows: out-of-plane shear strength=shear strain potential difference×out-of-plane shear modulus.

Figure 2:
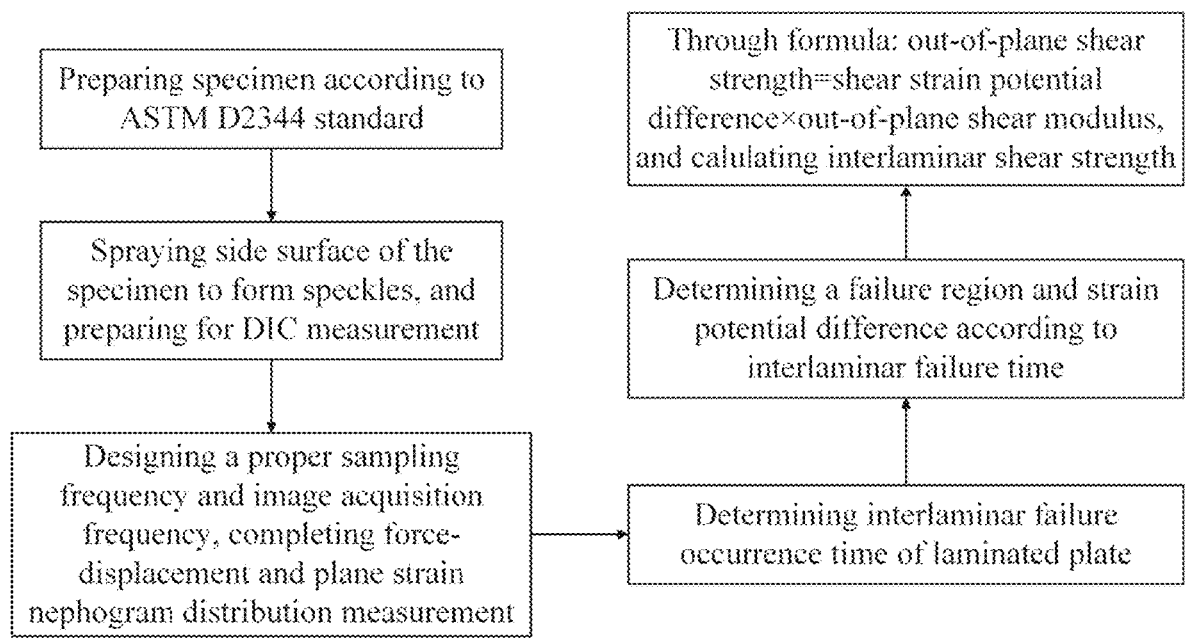
FIG. 2 is a schematic diagram of the method for determining interlaminar shear strength of the composite laminated plate according to Embodiment 1 of the present disclosure.

In the following, the method provided by this embodiment is described in detail with specific specimens. As shown in FIG. 2, the method includes the following steps 1-6:

In step 1: a side surface of a composite laminated plate specimen meeting requirements of ASTM D2344 standard is wiped with alcohol, the side surface is covered with a layer of matte white basecoat after the alcohol volatilizes naturally, and after the white paint solidifies by standing, matte black paint is parallelly sprayed above the specimen to make the black paint naturally fall onto the side surface of the specimen, and a ratio of the black paint to the white paint is about 1:1.

In step 2: the specimen is placed in an electronic universal testing machine using a clamping apparatus for short beam shear tests, where a surface of the specimen with the speckles faces a lens of a non-contact field-of-view deformation measurement system, and an indenter of the clamping apparatus for short beam shear tests is located in the middle of a supporting position (and the specimen). The testing machine is set to have an acquisition frequency of 60 Hz, the test preload of 5-100 N (for different specimens), and a loading rate of 1 mm/min.

In step 3: a focal length of a camera of the non-contact field-of-view deformation measurement system is adjusted to ensure that a photographing region on the side surface of the specimen is as clear as possible, an LED (Light emitting diode) lighting system is used to assist lighting, so as to ensure that the background of the photographing region is not reflective, and an aperture of the camera is adjusted to avoid overexposure. The camera is set to have a time interval of taking photos of 2 pictures per second, and photograph speckles synchronously when the testing machine starts the test.

In step 4: the test data of the testing machine and the speckle photos are enabled to be in one-to-one correspondence, which is achieved by aligning the time stamps. The testing machine has the acquisition frequency of 60 Hz, and an image acquisition frequency of 2 Hz, so one line of testing machine data is reserved every 30 lines from the second line to realize correspondence.

Figure 3:
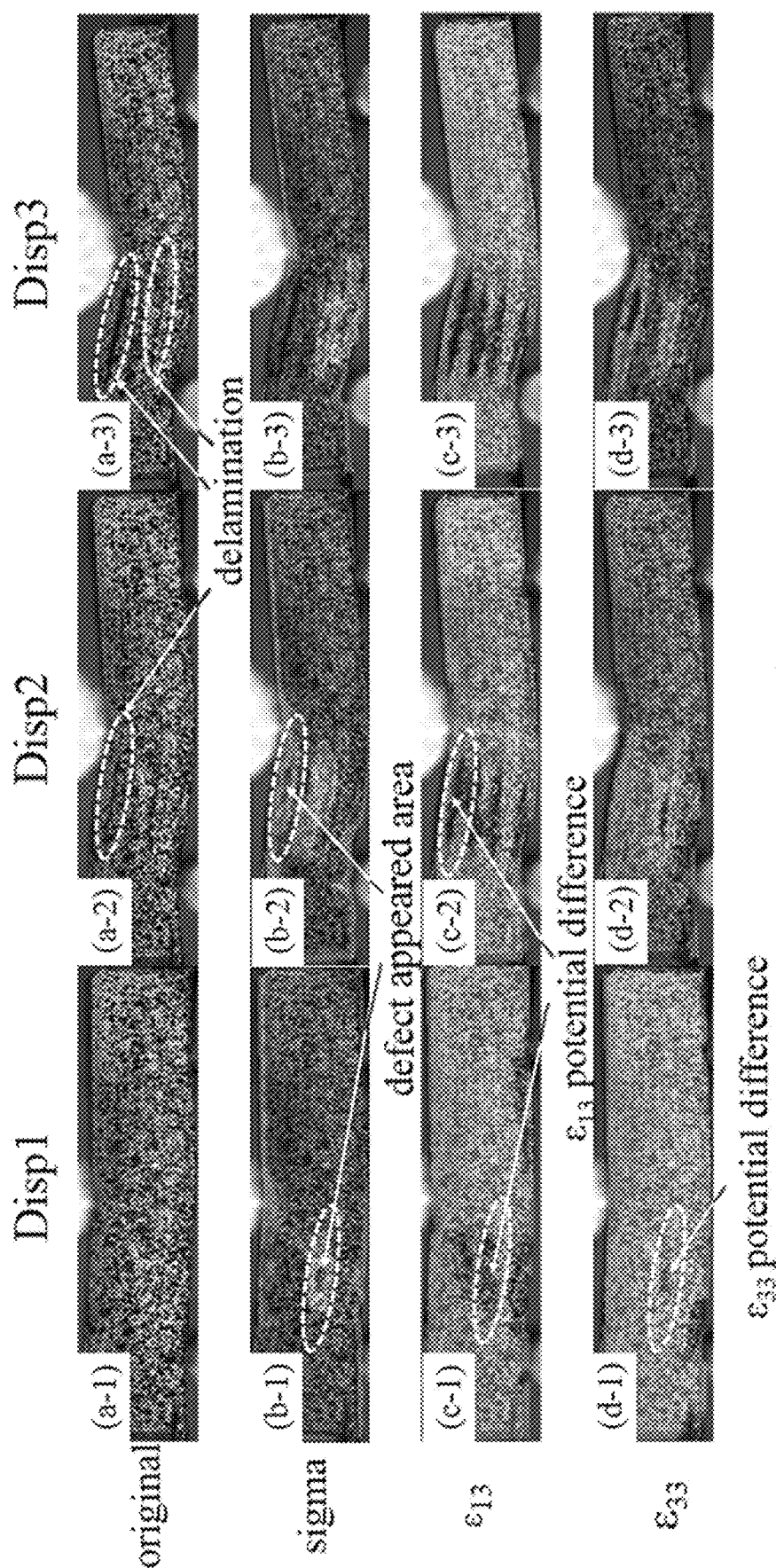
FIG. 3 is DIC nephograms of a side surface of a layer specimen of the composite laminated plate according to Embodiment 1 of the present disclosure.

In step 5: DIC measurement system software is used to analyze and process the speckle photos by doing the following steps: firstly, framing a region to be analyzed; secondly, selecting a calculation starting position, automatically dividing grids and calculating, and thirdly, finding out a delamination region defect position that leads to the curve descending according to the calculated shear strain and Sigma nephogram in combination with a descending position of the test force-displacement curve. The Sigma nephogram is as shown in FIG. 3. In FIG. 3, parts (1-1), (1-2) and (1-3) are test pictures corresponding to different displacements of the indenter. Different degrees of interlaminar delamination are found in parts (1-2) and (1-3), and the greater the displacement of the indenter, the greater the degree of interlaminar delamination, but there is no obvious intra-laminar failure found, indicating that the dominant failure of the material is interlaminar failure during the test. In FIG. 3, parts (2-1), (2-2) and (2-3) are grayscale images of the sigma nephogram. It is found through observation that when the indenter moves to a displacement point 1, although there is no obvious crack in part (1-1), there are obvious defects in the middle, near the indenter, of the specimen, thus determining that the interlaminar failure of the material here causes the drop of the curve load. When the indenter moves to a displacement point 2, an upper part, near the indenter, of the specimen appears defect features, thus determining that the interlaminar failure here causes the drop of the curve load. When the indenter moves to a displacement point 3, more interlaminar defects appear, causing the further drop of the curve load. As shown in FIG.

3, parts (3-1), (3-2) and (3-3) are out-of-plane shear strain nephograms, while parts (4-1), (4-2) and (4-3) are out-of-plane normal strain nephograms. As can be seen from comparison of these strain nephograms, after the indenter moves to the displacement point 1, there is an out-of-plane shear strain potential difference and an out-of-plane normal strain potential difference; and after the indenter moves to the displacement point 2, there is a shear strain potential difference, but the normal strain potential difference is not obvious. Therefore, it is considered that a failure mode of the short beam shear test is an interlaminar shear failure which is dominated by out-of-plane shear strain and assisted by the out-of-plane normal strain.

In step 6: two points are selected in the half thickness range (0.15 mm) of a single layer plate on both sides of the defect in the delamination region for shear strain historical variable output, a difference between the two points is calculated to draw a potential difference curve, and abrupt change positions of the potential difference curve and the test curve are found based on the test force-displacement curve to determine whether the defect causes the curve to descend. If the defect causes the curve to descend, the shear strain potential difference here is multiplied by the shear modulus to obtain the interlaminar shear strength.

Figure 4:
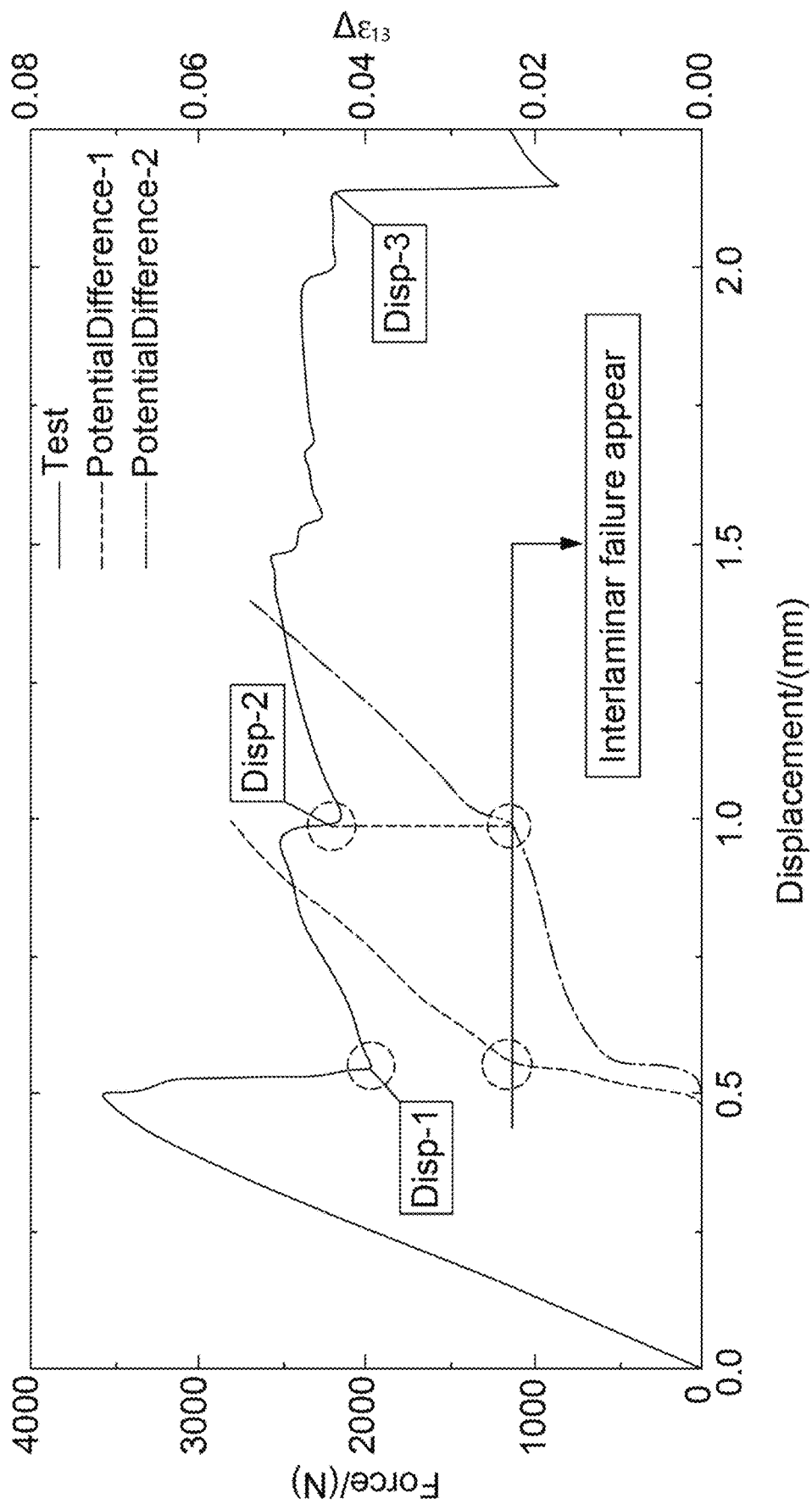
FIG. 4 is a test force-displacement grape and a potential difference grape according to Embodiment 1 of the present disclosure.

The interlaminar failure regions when the indenter moves to the displacement point 1 and the displacement point 2 are subjected to shear strain potential difference analysis. FIG. 4 is a short beam shear force-displacement curve of a certain test specimen and a shear strain potential difference variation curve around appeared different defects. In FIG. 4, the abscissa is displacement, the ordinate (left) is force, and the ordinate (right) is out-of-plane shear strain potential difference. The potential difference curve 1 represents the shear strain potential difference change of the delamination defect (part (2-1) in FIG. 3) in a middle of a specimen when the indenter reaches the displacement point 1; and the potential difference curve 2 represents the shear strain potential difference change of a delamination defect (part (2-2) in FIG. 3) in an upper of the specimen when the indenter reaches the displacement point 2. As can be seen from FIG. 4, with the increase of the displacement of the indenter, the shear strain potential difference around different defects increases, the load drops when the indenter moves to the displacement point 1, and the slope of the potential difference curve 1 abruptly changes, the corresponding delamination defect in the middle region of the specimen appears, and at this time, the potential difference curve 2 also has obvious slope change. However, as can be seen from part (2-1) in FIG. 3, the delamination defect in the upper of the specimen is not obvious at this time, so the slope change of the potential difference curve 2 can be caused by the influence of the delamination defect in the middle of the specimen on the subsequent overall mechanical response of the specimen, the subsequent overall mechanical response includes the variation trend of shear strain potential difference. When the indenter moves to the displacement point 2, the load drops again, the slope of the potential difference curve 2 abruptly changes, the corresponding delamination defect in the upper of the specimen appears. The out-of-plane shear strain values corresponding to twice delamination failures in different positions of the specimen are almost the same, there is reason to believe that the shear strain at this position corresponds to a critical value of the interlaminar shear strain, which is about 0.023, and the interlaminar shear strength is about 128 MP after the interlaminar shear strain of about 0.023 is multiplied by the out-of-plane shear modulus of the specimen of 2779 MPa.

Embodiment 2

In order to execute the method in Embodiment 1 to achieve corresponding functions and technical effects, a system for determining interlaminar shear strength of a composite laminated plate is provided below, the system includes:

a strain data acquisition module, configured to acquire plane strain nephograms, and strain data, corresponding to different displacements of an indenter, of a composite laminated plate specimen;

a force-displacement curve construction module, configured to construct a force-displacement curve of the composite laminated plate specimen based on the strain data, corresponding to different displacements of an indenter, of the composite laminated plate specimen;

a dominant strain determination module, configured to determine a dominant strain based on the plane strain nephograms and the strain data, corresponding to different displacements of an indenter, of the composite laminated plate specimen, where the dominant strain is an out-of-plane shear strain or an out-of-plane normal strain;

a current defect determination module, configured to read any one of defects in a plane strain nephogram corresponding to any one of the displacements as a current defect;

a module for determining adjacent single layers to be tested, configured to determine two single layers adjacent to the current defect as adjacent single layers to be tested;

a dominant strain potential difference-displacement curve construction module, configured to construct a dominant strain potential difference-displacement curve of the adjacent single layers to be tested based on the current defect;

a reference displacement determination module, configured to determine a displacement corresponding to an abrupt slope change point in the dominant strain potential difference-displacement curve as a reference displacement;

a critical strain value determination module, configured to determine a test force acting on the whole composite laminated plate specimen corresponding to the reference displacement of the indenter as a critical strain value based on the force-displacement curve;

a shear modulus acquisition module, configured to acquire shear modulus under the dominant strain; and a shear strength determination module, configured to determine a product of the critical strain value and the shear modulus under the dominant strain as shear strength between the adjacent single layers to be tested.

Embodiment 3

An electronic device is provided by this embodiment, including a memory and a processor. The memory is configured to store a computer program, the processor runs the computer program to enable the electronic device to execute the method for determining interlaminar shear strength of a composite laminated plate according to Embodiment 1.

The memory is a readable storage medium.

Various embodiments in this specification are described in a progressive way, and each embodiment focuses on the differences from other embodiments, so it is only necessary to refer to the same and similar parts between each embodiment. Since the system disclosed by the embodiments corresponds to the method disclosed by the embodiments, the description is relatively simple, and the reference is made to the descriptions in the method for related parts.

Specific examples are used herein for illustration of the principles and implementation methods of the present disclosure. The description of the embodiments is merely used to help illustrate the method and its core principles of the present disclosure. In addition, a person of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A method for determining interlaminar shear strength of a composite laminated plate which is implemented by an apparatus for determining interlaminar shear strength of a composite laminated plate, and the apparatus comprises:
an electronic universal testing machine, a digital image correlation (DIC) measurement apparatus, a clamping apparatus for short beam shear tests, and a control module,
wherein the control module is coupled to the clamping apparatus for short beam shear tests, the electronic universal testing machine and the DIC measurement apparatus;
the clamping apparatus for short beam shear tests is arranged on a testing bench of the electronic universal testing machine, and is configured to clamp a composite laminated plate specimen; and a side surface of the composite laminated plate specimen is provided with a plurality of speckles;
the electronic universal testing machine is configured to control an indenter to move toward the composite laminated plate specimen to exert pressure on the composite laminated plate specimen, and to acquire strain data, corresponding to different displacements of the indenter, of the composite laminated plate specimen, the strain data comprises test forces acting on the whole composite laminated plate specimen, an out-of-plane shear strain of each of the speckles on the composite laminated plate specimen, and an out-of-plane normal strain of each of the speckles on the composite laminated plate specimen;
the DIC measurement apparatus is configured to determine plane strain nephograms, corresponding to the different displacements of the indenter, of the composite laminated plate specimen based on images of the side surface of the composite laminated plate specimen;
the method comprises following steps:
acquiring plane strain nephograms, and strain data, corresponding to the different displacements of the indenter, of a composite laminated plate specimen;
constructing a force-displacement curve of the composite laminated plate specimen based on the strain data, corresponding to the different displacements of the indenter, of the composite laminated plate specimen;
determining a dominant strain based on the plane strain nephograms and the strain data, corresponding to the different displacements of the indenter, of the composite laminated plate specimen, wherein the dominant strain is the out-of-plane shear strain or the out-of-plane normal strain;
reading any one of defects in a plane strain nephogram corresponding to any one of the displacements of the indenter as a current defect;
determining two single layers adjacent to the current defect as adjacent single layers to be tested;
constructing a dominant strain potential difference-displacement curve of the adjacent single layers to be tested based on the current defect;
determining a displacement corresponding to an abrupt slope change point in the dominant strain potential difference-displacement curve as a reference displacement;
determining a test force acting on the whole composite laminated plate specimen corresponding to the reference displacement of the indenter as a critical strain value based on the force-displacement curve;
acquiring a shear modulus under the dominant strain;
determining a product of the critical strain value and the shear modulus under the dominant strain as shear strength between the adjacent single layers to be tested.

2. The method for determining interlaminar shear strength of a composite laminated plate according to claim 1, wherein determining a dominant strain based on the plane strain nephograms and the strain data, corresponding to the different displacements of the indenter, of the composite laminated plate specimen comprises following steps:
setting an iteration number $i=1$;
setting a cumulative amount corresponding to the out-of-plane shear strain $m=0$;
setting a cumulative amount corresponding to the out-of-plane normal strain $n=0$;
determining any one of the displacements as a current displacement;
reading a defect of a plane strain nephogram corresponding to the current displacement as a reference defect detection result;
constructing an out-of-plane shear strain nephogram based on the out-of-plane shear strain, corresponding to the current displacement, of each of the speckles on the composite laminated plate specimen;
reading a defect of the out-of-plane shear strain nephogram corresponding to the current displacement as a first detection result;
determining a coincidence rate of the first detection result and the reference defect detection result as a first coincidence rate;
constructing an out-of-plane normal strain nephogram based on the out-of-plane normal strain, corresponding to the current displacement, of each of the speckles on the composite laminated plate specimen;
reading a defect of the out-of-plane normal strain nephogram corresponding to the current displacement as a second detection result;
determining a coincidence rate of the second detection result and the reference defect detection result as a second coincidence rate;
returning to Step "setting an iteration number $i=1$" when the second coincidence rate is equal to the first coincidence rate;
increasing a value of the cumulative amount corresponding to the out-of-plane normal strain n by 1 when the second coincidence rate is greater than the first coincidence rate;
increasing a value of the cumulative amount corresponding to the out-of-plane shear strain m by 1 when the second coincidence rate is less than the first coincidence rate;
updating the current displacement, increasing a value of the iteration number i by 1, and returning to Step "reading a defect of a plane strain nephogram corresponding to the current displacement as a reference defect detection result" until the value of the iteration number i reaches a threshold of the iteration number;

determining the out-of-plane normal strain as the dominant strain when the cumulative amount corresponding to the out-of-plane normal strain n is greater than the cumulative amount corresponding to the out-of-plane shear strain m; and determining the out-of-plane shear strain as the dominant strain when the cumulative amount corresponding to the out-of-plane normal strain n is less than or equal to the cumulative amount corresponding to the out-of-plane shear strain m.

3. The method for determining interlaminar shear strength of a composite laminated plate according to claim 1, wherein constructing a dominant strain potential difference-displacement curve of the adjacent single layers to be tested based on the current defect comprises following steps:

determining a point at a preset distance directly above a center point of the current defect as a first feature point, wherein the preset distance is less than a thickness of any single layer in the composite laminated plate specimen;

determining a point at a preset distance directly below the center point of the current defect as a second feature point;

acquiring dominant strains, corresponding to the different displacements of the indenter, of the first feature point based on a time stamp;

acquiring dominant strains, corresponding to the different displacements of the indenter, of the second feature point based on the time stamp;

determining any one of the displacements as the current displacement;

determining a difference between a dominant strain, corresponding to the current displacement of the indenter, of the first feature point and a dominant strain, corresponding to the current displacement of the indenter, of the second feature point as a dominant strain potential difference, corresponding to the current displacement of the indenter, between the adjacent single layers to be tested; and constructing the dominant strain potential difference-displacement curve of the adjacent single layers to be tested with the displacements as abscissa and dominant strain potential differences between the adjacent single layers to be tested as ordinate.

4. The method for determining interlaminar shear strength of a composite laminated plate according to claim 1, wherein, after determining a product of the critical strain value and the shear modulus under the dominant strain as shear strength between the adjacent single layers to be tested, the method further comprises following steps:

updating the adjacent single layers to be tested, taking a defect corresponding to the updated adjacent single layers to be tested as the current defect, and returning to Step "constructing a dominant strain potential difference-displacement curve of the adjacent single layers to be tested based on the current defect" until all adjacent single layers are traversed, thus obtaining the shear strength between any adjacent single layers of all adjacent single layers in the composite laminated plate specimen.

5. An electronic device, comprising a memory and a processor, wherein the memory is configured to store a computer program, the processor runs the computer program to enable the electronic device to execute the method for determining interlaminar shear strength of a composite laminated plate according to claim 1.

6. The electronic device according to claim 5, wherein the memory is a readable storage medium.

7. The electronic device according to claim 5, wherein determining a dominant strain based on the plane strain nephograms and the strain data, corresponding to the different displacements of the indenter, of the composite laminated plate specimen comprises following steps:

setting an iteration number i=1;

setting a cumulative amount corresponding to the out-of-plane shear strain m=0;

setting a cumulative amount corresponding to the out-of-plane normal strain n=0;

determining any one of the displacements as a current displacement;

reading a defect of a plane strain nephogram corresponding to the current displacement as a reference defect detection result;

constructing an out-of-plane shear strain nephogram based on the out-of-plane shear strain, corresponding to the current displacement, of each of the speckles on in the composite laminated plate specimen;

reading a defect of the out-of-plane shear strain nephogram corresponding to the current displacement as a first detection result;

determining a coincidence rate of the first detection result and the reference defect detection result as a first coincidence rate;

constructing an out-of-plane normal strain nephogram based on the out-of-plane normal strain, corresponding to the current displacement, of each of the speckles on in the composite laminated plate specimen;

reading a defect of the out-of-plane normal strain nephogram corresponding to the current displacement as a second detection result;

determining a coincidence rate of the second detection result and the reference defect detection result as a second coincidence rate;

returning to Step "setting an iteration number i=1" when the second coincidence rate is equal to the first coincidence rate;

increasing a value of the cumulative amount corresponding to the out-of-plane normal strain n by 1 when the second coincidence rate is greater than the first coincidence rate;

increasing a value of the cumulative amount corresponding to the out-of-plane shear strain m by 1 when the second coincidence rate is less than the first coincidence rate;

updating the current displacement, increasing a value of the iteration number i by 1, and returning to Step "reading a defect of a plane strain nephogram corresponding to the current displacement as a reference defect detection result" until the value of the iteration number i reaches a threshold of the iteration number;

determining the out-of-plane normal strain as the dominant strain when the cumulative amount corresponding to the out-of-plane normal strain n is greater than the cumulative amount corresponding to the out-of-plane shear strain m; and determining the out-of-plane shear strain as the dominant strain when the cumulative amount corresponding to the out-of-plane normal strain n is less than or equal to the cumulative amount corresponding to the out-of-plane shear strain m.

8. The electronic device according to claim 7, wherein the memory is a readable storage medium.

9. The electronic device according to claim 5, wherein constructing a dominant strain potential difference-displacement curve of the adjacent single layers to be tested based on the current defect comprises following steps:
   determining a point at a preset distance directly above a center point of the current defect as a first feature point, wherein the preset distance is less than a thickness of any single layer in the composite laminated plate specimen;
   determining a point at a preset distance directly below the center point of the current defect as a second feature point;
   acquiring dominant strains, corresponding to the different displacements of the indenter, of the first feature point based on a time stamp;
   acquiring dominant strains, corresponding to the different displacements of the indenter, of the second feature point based on the time stamp;
   determining any one of the displacements as the current displacement;
   determining a difference between a dominant strain, corresponding to the current displacement of the indenter, of the first feature point and a dominant strain, corresponding to the current displacement of the indenter, of the second feature point as a dominant strain potential difference, corresponding to the current displacement of the indenter, between the adjacent single layers to be tested; and
   constructing the dominant strain potential difference-displacement curve of the adjacent single layers to be tested with the displacements as abscissa and dominant strain potential differences between the adjacent single layers to be tested as ordinate.

10. The electronic device according to claim 9, wherein the memory is a readable storage medium.

11. The electronic device according to claim 5, wherein after determining a product of the critical strain value and the shear modulus under the dominant strain as shear strength between the adjacent single layers to be tested, the method further comprises following steps:
   updating the adjacent single layers to be tested, taking a defect corresponding to the updated adjacent single layers to be tested as the current defect, and returning to Step "constructing a dominant strain potential difference-displacement curve of the adjacent single layers to be tested based on the current defect" until all adjacent single layers are traversed, thus obtaining the shear strength between any adjacent single layers of all adjacent single layers in the composite laminated plate specimen.

12. The electronic device according to claim 11, wherein the memory is a readable storage medium.

13. A system for determining interlaminar shear strength of a composite laminated plate, comprising:
   a strain data acquisition module, configured to acquire plane strain nephograms, and strain data, corresponding to different displacements of an indenter, of a composite laminated plate specimen;
   a force-displacement curve construction module, configured to construct a force-displacement curve of the composite laminated plate specimen based on the strain data, corresponding to different displacements of an indenter, of the composite laminated plate specimen;
   a dominant strain determination module, configured to determine a dominant strain based on the plane strain nephograms and the strain data, corresponding to different displacements of an indenter, of the composite laminated plate specimen, wherein the dominant strain is an out-of-plane shear strain or an out-of-plane normal strain;
   a current defect determination module, configured to read any one of defects in a plane strain nephogram corresponding to any one of the displacements as a current defect;
   a module for determining adjacent single layers to be tested, configured to determine two single layers adjacent to the current defect as adjacent single layers to be tested;
   a dominant strain potential difference-displacement curve construction module, configured to construct a dominant strain potential difference-displacement curve of the adjacent single layers to be tested based on the current defect;
   a reference displacement determination module, configured to determine a displacement corresponding to an abrupt slope change point in the dominant strain potential difference-displacement curve as a reference displacement;
   a critical strain value determination module, configured to determine a test force acting on the whole composite laminated plate specimen corresponding to the reference displacement of the indenter as a critical strain value based on the force-displacement curve;
   a shear modulus acquisition module, configured to acquire shear modulus under the dominant strain; and
   a shear strength determination module, configured to determine a product of the critical strain value and the shear modulus under the dominant strain as shear strength between the adjacent single layers to be tested.

* * * * *